United States Patent [19]
Chaves

[11] Patent Number: 5,530,320
[45] Date of Patent: Jun. 25, 1996

[54] FLASH FIRE CONTROL SYSTEM FOR LEAF SHUTTER CAMERAS

[76] Inventor: Neal Chaves, 21 Moody Pt. Dr., Newmarket, N.H. 03857

[21] Appl. No.: 500,455

[22] Filed: Jul. 10, 1995

[51] Int. Cl.⁶ .................................................. H05B 41/00
[52] U.S. Cl. .................. 315/241 P; 315/241 S; 354/147
[58] Field of Search .............. 315/241 P, 241 S, 315/312, 314, 315; 354/145.1, 146, 147, 148, 149.1, 149.11

[56] References Cited

U.S. PATENT DOCUMENTS 3,927,412  12/1975  Ellin .......................... 354/143
4,415,247  11/1983  Takematsu .................. 354/33
4,761,666   8/1988  Goto ........................... 354/133

*Primary Examiner*—Robert Pascal
*Assistant Examiner*—David Vu

[57] ABSTRACT

A device for controlling the firing of one or more electronic flash units by a leaf type camera shutter. Flash synchonization is provided by switch selectible modes at shutter opening, at shutter closing, or with a plurality of electronic flash units, at both shutter opening and shutter closing. The flash fire control system for leaf shutter cameras makes possible a wide variety of photographic lighting effects and can be incorporated in a shutter mechanism, camera body, electronic flash unit or flash remote controller or configured as a self-contained accessory device.

2 Claims, 1 Drawing Sheet

FLASH FIRE CONTROL SYSTEM FOR LEAF SHUTTER CAMERAS

BACKGROUND

The inventor has more than twenty years experience in professional photography and photographic lighting. This work has frequently involved both moving and stationary subject matter illuminated by electronic flash. In some of these situations, the available methods of synchronizing the electronic flash with leaf shutter type cameras limited the inventor's ability to produce a visualized result.

In the majority of cameras, and in all professional cameras equipped with leaf-type shutters, the closing of the flash contacts which discharges the electronic flash occurs at the instant of shutter opening. For most general photography this arrangement is satisfactory and it has the advantage of making the entire duration of shutter opening available for the flash exposure.

The disadvantage to shutters which synchronize upon opening occurs when subjects are illuminated by strong ambient light in addition to electronic flash. Under these conditions unnatural "ghost images" are recorded. In the case of subjects in motion, motion streaks seem to precede the subject rather than follow it. This phenomenon is produced because the brief burst of electronic flash at the start of the exposure "freezes" the subject, which then continues to move while illuminated by ambient light for the remainder of the exposure and is recorded as a blur.

Several 35 mm single lens reflex, focal plane type shutter cameras are available with switch-selectable synchronization modes, so that the user can choose to discharge the electronic flash at shutter opening, or at shutter closure. To the inventor's knowledge, no such flash synchronization control is incorporated in the leaf shutter type cameras favored by professional photographers.

THE OBJECT OF THE INVENTION

The object of the flash fire control system for leaf shutter cameras is to provide the users of such cameras with a variety of switch-selectable flash synchronization modes. The invention will provide flash synchronization at shutter opening, commonly called "instantaneous synchronization", and "delayed synchronization" at shutter closure.

A further goal of the invention is to synchronize two separate electronic flash units with the same shutter so as to fire them instantaneously and simultaneously through two electrically isolated circuits, or to fire one at shutter opening and the other at shutter closure.

The availability of such a flash fire control system as an accessory to the leaf shutter camera enables photographers to create a wide variety of visually pleasing flash photographs including unusual special effects. The invention is not intended to be compatible with focal plane type shutters, and it will not function with the majority of focal plane shutters currently in use.

SUMMARY OF THE INVENTION

The invention is equipped with one input and two outputs for the electronic flash synchronization pulse. In use, the photographer connects a flash sync cord from the camera shutter to the input receptacle on the invention. The invention is equipped with two electrically isolated synchronization output fittings. These are "PC" type fittings normally found on camera shutters. A sync cord, or two sync cords, connected to these outputs may then be connected to one or two electronic flash units.

The invention includes an "Instant/Delay" slide switch, which selects, for an electronic flash unit connected to an "Instant/Delay PC" output fitting, either instantaneous flash synchronization upon shutter opening, or the "delay" mode which synchronizes flash firing with shutter closure.

The sync cord from a second electronic flash unit may be connected to a second, electrically isolated "Instant PC" output fitting. By moving the selector switch, the user can chose to synchronize two flash units instantaneously and simultaneously at shutter opening, or to synchronize one flash unit at shutter opening and the other at shutter closure.

In addition, the electrically isolated synchronization outputs provided by the invention permit the simultaneous hard-wired synchronization of two electronic flash units of different size or design and with different synchronization voltages. Because the invention has its own 9 Volt DC low current synchronization pulse which is isolated from the electronic flash unit synchronization voltages, the invention protects shutter synchronization contacts from the high synchronization voltages some flash units produce.

DESCRIPTION OF THE PREFERRED EMBODIMENTS

Figure 1:
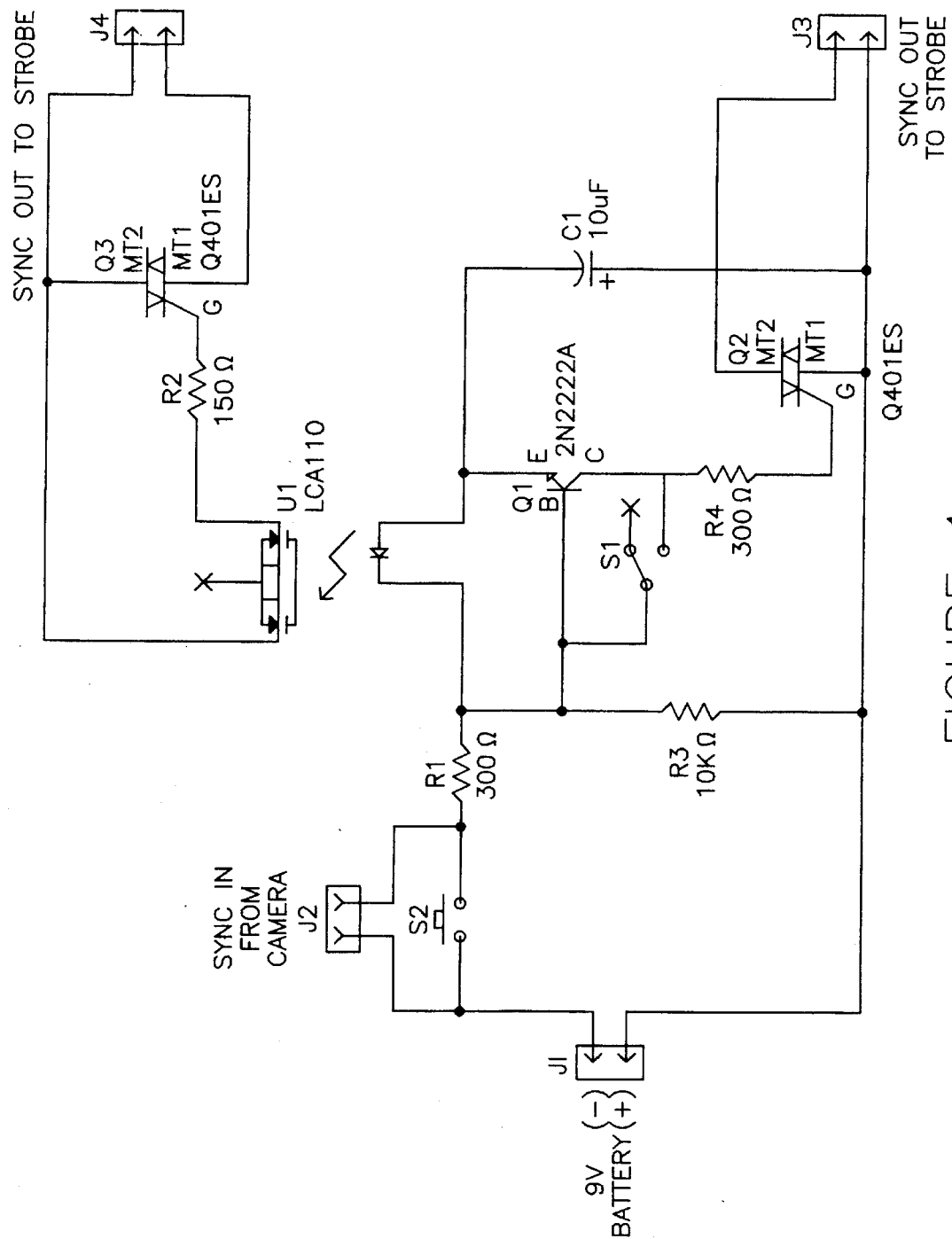
FIG. 1 is a schematic diagram of the most preferred embodiment of the flash fire control system for leaf shutter cameras of the present invention.

Before proceeding with a detailed description of the preferred embodiment of the present invention, it should be noted that many thousands of leaf shutters cameras are currently in use. In order to accommodate these existing cameras, a self-contained accessory containing the flash fire control circuitry of the present invention is immediately required. Some or all of the new and unique elements of the invention, however, might also be incorporated into camera bodies, shutters, electronic flash units or electronic flash remote control systems themselves.

Referring now specifically to FIG. 1, there is now illustrated the most preferred embodiment of the invention as a self-contained accessory to leaf-type shutter cameras.

DC power to the device is supplied by a 9 Volt battery connected at J1. The sync cord from the camera shutter is connected at J2. Switch S2 is a momentary push button "test" switch which simulates shutter contact closing and opening.

Switch S1 selects either an instantaneous or delayed flash synchronization for the PC output at J3. A second PC fitting at J4 provides an isolated instantaneous synchronization.

In operation, with single pole/single throw switch S1 closed in the "instantaneous" position, when the synchronization contacts of a leaf shutter connected to the input or the contacts of test switch S2 are closed current flows from the battery through capacitor C1, the LED of opto-isolator U1 and ballast resistor R1. This causes the MOSFET output of U1 to conduct, and if an electronic flash synchronization voltage is present at J4, triac Q3 will be gated through resistor R2 and the electronic flash unit connected at J4 will be triggered. The MT2 pole of the triac Q3 is being connected to R2. A second, lesser current flows from the battery through resistor R3 to R1 and the base of NPN transistor Q1. A negative potential at the base of Q1 causes Q1 to turn off.

A negative potential also develops at the gate of triac Q2 through S1 and gate resistor R4. This causes Q2 to be gated and trigger an electronic flash unit connected to the output at J3. The MT1 pole of the triac Q2 is being connected to resistor R4.

The circuit resets when the shutter closes, and the shutter open, or when the push button switch S2 is released, with C1 discharging through R3 to the base of Q1, turning Q1 on, C1 then continuing to discharge through Q1.

With switch S1 in the open or "delay" position, current from the battery flows through C1, the LED of opto-isolator U1 and resistor R1.

When the circuit is opened again and battery current removed by the breaking of shutter contacts at shutter closure, or by the release of test push button switch S2, C1 discharges through R3 to the base of transistor Q1, turning it on. A negative potential develops at the gate of Q2 as C1 then discharges through Q2, R4 and Q1. Q2 is then gated and triggers an electronic flash unit connected at J3.

While we have shown and described what we consider to be the most preferred embodiment of the present invention, it will be appreciated by those skilled in the art that modifications of such embodiments may be made, and it is intended to cover in the appended claims all such modifications as fall within the true spirit and scope of the invention.

I claim:

1. A flash fire control system for leaf shutter cameras to manage a single shutter synchronization pulse for a plurality of electronic flash units, said flash fire control system incorporating switch-selectible modes for a plurality of electrically isolated synchronization output triggers to configure said output triggers for either simultaneous and instantaneous triggering of all of the said plurality of electronic flash units upon the opening of said leaf shutter, or the instantaneous triggering upon opening of said shutter for one or more of the said plurality of electronic flash units and triggering upon the closure of said shutter for one or more of the said plurality of electronic flash units, comprising:

a battery;

a synchronization input for connecting said flash fire control system to the flash synchronization contacts of a leaf type shutter;

a momentary push button test switch to simulate closure and opening of the camera shutter flash synchronization contacts;

a synchronization circuit for detecting the closure and opening of said flash synchronization contacts;

a plurality of synchronization output triggers, electrically isolated from said synchronization input and from each other which provide for flash triggering of each of the plurality of said electronic flash units;

an instantaneous switching circuit, interfaced between said synchronization circuit and one or more of the plurality of said synchronization output triggers to provide instantaneous flash triggering upon closure of said leaf shutter synchronization contacts;

a mode selectible electronic switching circuit interfaced between said synchronization circuit and one or more of the plurality of said synchronization output triggers, said mode selectible electronic switching circuit providing for flash triggering either upon the closure of said leaf shutter contacts or upon the opening of said contacts after an initial closure.

2. A flash fire control system for leaf shutter cameras according to claim 1 wherein;

said synchronization circuit further comprising
      a ballast resistor, an LED and a polarized capacitor in series with said synchronization input to charge said capacitor whenever said leaf shutter flash synchronization contacts are closed and a resistor an common with the positive pole of said capacitor, through which a charge on said capacitor may discharge upon the re-opening of said leaf shutter flash synchronization contacts;

said instantaneous switching circuit further comprising a MOSFET output opto-isolator, having as its input the LED of said synchronization circuit, said MOSFET output being in series with a resistor and the gate of a triac flash synchronization trigger and the MT2 pole of said triac; and Said mode selectible electronic switching circuit further comprising; an NPN switching transistor, the emitter of said transistor in common with the negative pole of said polarized capacitor and the anode of said LED, and having its base in common with the cathode of said LED, said ballast resistor, said discharge resistor and one pole of a single pole/single throw switch, which when closed shorts the base of said transistor to the collector of said transistor, said collector being in series with a gate resistor and the gate of a triac flash synchronization trigger, the MT1 pole of said triac being in common with the positive poles of said battery and said polarized capacitor.

* * * * *